US006764705B2

(12) United States Patent
Shefet

(10) Patent No.: US 6,764,705 B2
(45) Date of Patent: Jul. 20, 2004

(54) CASINGLESS FLOWABLE FOOD PRODUCTION METHODS, SYSTEMS, AND ASSOCIATED ELONGATED FORMING TUBES

(75) Inventor: Sarid M. Shefet, Cary, NC (US)

(73) Assignee: ConAgra Foods, Inc., Edina, MN (US)

( * ) Notice: Subject to any disclaimer, the term of this patent is extended or adjusted under 35 U.S.C. 154(b) by 13 days.

(21) Appl. No.: 10/231,835

(22) Filed: Aug. 30, 2002

(65) Prior Publication Data

US 2004/0043121 A1 Mar. 4, 2004

(51) Int. Cl.[7] ............................................. A22C 11/00
(52) U.S. Cl. ........................ 426/513; 99/353; 99/384; 99/441; 426/241; 426/517
(58) Field of Search ............... 426/513, 516, 426/517, 241, 243, 118; 99/353, 355, 384, 441

(56) References Cited

U.S. PATENT DOCUMENTS

| | | | |
|---|---|---|---|
| 3,889,013 A | * 6/1975 | Moule | 426/513 |
| 4,079,666 A | 3/1978 | Plemons et al. | 99/355 |
| 4,113,890 A | * 9/1978 | Long | 426/513 |
| 4,565,282 A | 1/1986 | Olsson et al. | 198/778 |
| 4,582,047 A | 4/1986 | Williams | 126/369 |
| 4,752,486 A | * 6/1988 | Niedenthal et al. | 426/118 |
| 4,766,645 A | 8/1988 | Lamartino et al. | 17/49 |
| 4,997,365 A | 3/1991 | Lanham | 432/121 |
| 5,049,108 A | 9/1991 | Staudenrausch | 452/48 |
| 5,078,120 A | 1/1992 | Hwang | 126/21 A |
| 5,277,301 A | 1/1994 | Fenty | 198/778 |
| 5,480,346 A | 1/1996 | Kasai et al. | 452/47 |
| RE35,259 E | 6/1996 | Williams | 126/369 |
| 5,788,563 A | 8/1998 | Nakamura et al. | 452/47 |
| 5,942,265 A | 8/1999 | Roberds et al. | 426/59 |
| 6,146,674 A | * 11/2000 | Manna et al. | 426/513 |
| 6,279,646 B1 | 8/2001 | Ross et al. | 164/507 |

FOREIGN PATENT DOCUMENTS

FR 2.088.622 4/1970

OTHER PUBLICATIONS

Article, "Continuous Process Systems", Alkar, http://www.alkar.com (date unavailable; believed to be dated before Mar. 1, 2002) pp. 1–3.
Article, "Batch Ovens", Alkar, http://www.alkar.com (date unavailable; believed to be dated before Mar. 1, 2002) pp. 1–3.
Brochure, "Fessmann Turbomat 7000: Industrial Smoking and Cooking", Fessman Group (date unavailable; believed to be dated before Mar. 1, 2002) pp. 1–8.
Brochure, "Fessmann Smoking Cooking Cooling", Fessman Group (date unavailable; believed to be dated before Mar. 1, 2002) pp. 1–8.
Brochure, "Fessmann Transfer 4000: Continuous Smoking, Cooking and Cooling", Fessman Group (date unavailable; believed to be dated before Mar. 1, 2002) pp. 1–9.
Pictures of the inside of a conventional prior art oven from Alkar.

* cited by examiner

*Primary Examiner*—George C. Yeung
(74) *Attorney, Agent, or Firm*—Myers Biegel Sibley & Sajovec, PA

(57) ABSTRACT

Systems, methods, and associated devices for casingless production of food products include: (a) providing at least one forming tube having sufficient structural rigidity to be substantially non-deformable and having a preformed internal cavity space of predetermined size and shape; (b) introducing a quantity of flowable food emulsion into the at least one forming tube; and (c) advancing the emulsion through the at least one forming tube while exposing the emulsion to predetermined processing conditions that convert the flowable emulsion held in the at least one forming tube to a non-flowable food product having the molded shape of the forming tube cavity.

55 Claims, 5 Drawing Sheets

CASINGLESS FLOWABLE FOOD PRODUCTION METHODS, SYSTEMS, AND ASSOCIATED ELONGATED FORMING TUBES

FIELD OF THE INVENTION

The present invention relates to the casingless production of food product.

BACKGROUND OF THE INVENTION

Conventionally, natural or artificial casings can be used to form and hold food products to help retain the shape and/or content integrity during processing, such as cooking, heating, or freezing. The food product can start as a flowable emulsion that can be stuffed into the casing or the casing can be formed around the emulsion by employing a co-extrusion process using a stuffer, extruder, or the like. The casing itself may be disposable and removed from the food product prior to shipping and/or eating or may remain intact on the food product during consumption and ingested.

Known extruders and co-extruders are available from various commercial manufacturers including, but not limited to, Kontura an apparatus manufactured by Townsend Engineering Co., located in Des Moines, Iowa. Stuffers are available from various commercial manufacturers including, but not limited to, HITEC Food Equipment, Inc., located in Elk Grove Village, Ill., Townsend Engineering Co., located in Des Moines, Iowa, Robert Reiser & Co., Inc., located in Canton, Mass., and Handtmann, Inc., located in Buffalo Grove, Ill. Exemplary stuffer and/or linker apparatus are also described in U.S. Pat. Nos. 5,788,563; 5,480,346; 5,049,108; and 4,766,645. The contents of these patents are hereby incorporated by reference as if recited in full herein.

However, there remains a need to provide cost-effective automated casingless processing systems of food items.

SUMMARY OF THE INVENTION

The present invention provides casingless food production systems and methods. In certain embodiments, the methods and systems are configured to provide casingless lengths of food product using elongated substantially rigid forming tubes. The flowable food can be configured to enter the forming tube as a flowable emulsion that is moved (pumped, pushed, conveyed) downstream of the entry location. In operation, as the food product moves forward, it can be exposed to predetermined processing conditions that alter the physical form of the emulsion to a non-flowable state having increased viscosity relative to its entrance state. The change in the physical state can be chemically or thermally initiated. Over time, the product can take on the shape of the forming tube so that it has sufficient structural rigidity to retain its tube formed shape without substantial deformation after its release therefrom. As such, in certain embodiments, the released food item may be compressible (semi-solid and yielding to tactile compression forces) or substantially incompressible (frozen or solid) at ambient conditions. Although formed into a desired shape, it may be cooked or uncooked at its exit.

The present invention provides casingless food production systems and methods. The term "casingless" means that the food product can be produced without requiring the assistance of a holding skin such as a collagen or natural skin casing. The term encompasses food items that are conventionally produced using casings (such as hot dogs and sausages and the like), as well as food items that have not required the use of casings (meatballs, popsicles, baked goods, shaped burgers, and the like).

In certain embodiments, the forming tube is configured from a non-metallic material suitable for cooking in a microwave oven. The forming tube may have a non-stick inner surface. In particular embodiments a plurality of forming tubes are arranged in a common processing system (such as a microwave oven) to concurrently produce a plurality of discrete lengths of food product increasing the production capacity, as may be suitable for particular commercial high-capacity applications.

The food may be cooked, frozen, smoked, cured, pickled, partially dehydrated, or otherwise processed as it moves through the forming tube via a single or multiple processing regions.

In certain embodiments, a casingless method for producing food products, includes: (a) providing at least one forming tube having sufficient structural rigidity to be substantially non-deformable and having a preformed internal cavity space of predetermined size and shape; (b) introducing a quantity of flowable food emulsion into the at least one forming tube; and (c) advancing the emulsion through the at least one forming tube while exposing the emulsion to predetermined processing conditions that convert the flowable emulsion held in the at least one forming tube to a non-flowable food product having the molded shape of the forming tube cavity.

Other embodiments are directed to casingless food production systems. The systems include: (a) at least one forming tube having sufficient structural rigidity to define a preformed cavity space with a predetermined configuration, the at least one forming tube having opposing ingress and egress portions; (b) at least one flowable food emulsion source in fluid communication with the ingress portion of the at least one forming tube; (c) at least one pump in fluid communication with the at least one forming tube for introducing the emulsion from the emulsion source with sufficient pressure into the at least forming tube to cause the emulsion to advance along the length of the tube to exit at the egress portion thereof; and (d) a processing region operably associated with the at least one forming tube. In operation, the processing region is configured to expose the emulsion to predetermined processing conditions that converts the emulsion held in the at least one forming tube to a non-flowable state having the molded shape of the forming tube cavity at the egress portion of the forming tube.

Other embodiments are directed to apparatus or producing casingless food products. The apparatus include: (a) at least one forming tube having sufficient structural rigidity to be substantially non-deformable and having a preformed internal cavity space of predetermined size and shape; (b) a pump for flowably introducing a quantity of flowable food emulsion into the at least one forming tube; and (c) means for advancing the emulsion through the at least one forming tube while exposing the emulsion to predetermined processing conditions that convert the flowable emulsion held in the at least one forming tube to a non-flowable food product having the molded shape of the forming tube cavity.

Still other embodiments are directed to forming tube assemblies for the production of casingless foodstuffs. The assemblies include an elongate forming tube having a preformed cavity with a predetermined mold shape and opposing ingress and egress portions and an emulsion source in fluid communication with the forming tube. The emulsion source includes a quantity of flowable emulsion comprising meat and/or meat analogs.

DESCRIPTION OF EMBODIMENTS OF THE INVENTION

Figure 1:
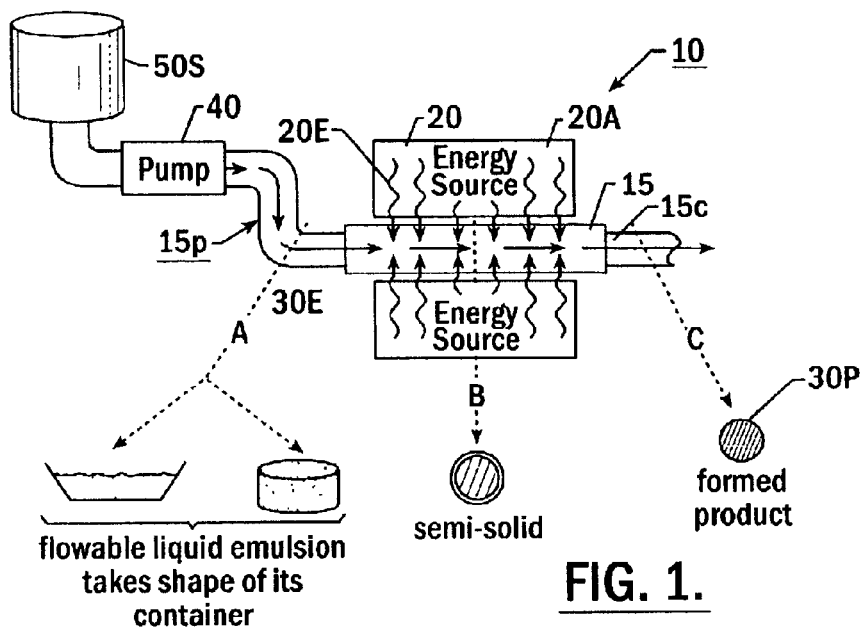
FIG. 1 is a schematic side view of a casingless foodstuff production system employing an elongated forming tube according to embodiments of the present invention.

The present invention will now be described more fully hereinafter with reference to the accompanying figures, in which embodiments of the invention are shown. This invention may, however, be embodied in many different forms and should not be construed as limited to the embodiments set forth herein. Like numbers refer to like elements throughout. In the figures, certain layers, components or features may be exaggerated for clarity, and broken lines illustrate optional features or operations unless specified otherwise. In addition, the sequence of operations (or steps) is not limited to the order presented in the claims unless specifically indicated otherwise.

In the description of the present invention that follows, certain terms are employed to refer to the positional relationship of certain structures relative to other structures. As used herein, the term "forward" and derivatives thereof refer to the general or primary direction that food travels as it moves inside a food processor from a processing point or region to the next processing point or region; this term is intended to be synonymous with the term "downstream," which is often used in manufacturing environments to indicate that certain material being acted upon is farther along in the manufacturing process than other material. Conversely, the terms "rearward" and "upstream" and derivatives thereof refer to the directions opposite, respectively, the forward and downstream directions.

The present invention may be particularly suitable to produce food items such as, but not limited to, elastic or partially elastic food items such as meat products, cheese (e.g., mozzarella strands), or dough. In certain embodiments, the food products are whole or partial meat mixtures tat include a single or multiple different types of meat and/or meat analogs including, but not limited to, beef, poultry, lamb, fish, veal, and pork, including derivatives and/or meat analogs of selected ones or combinations of the meat. Other meats may also be employed where desired. The meat-based food products may be meat sticks or strands, elongate meat products such as hot dogs, sausages (of any type including Vienna sausage (typically a beef, pork, and veal emulsion blend)), and the like. In other embodiments, the food products need not be elongate and can be candy and/or frozen dessert snack treats such as ice cream, yogurt, popsicles, and the like.

In certain embodiments, the product can be cooked as it progresses along a length of the forming tube. In other embodiments, the product is processed to retain its shape and is cooked after it exits the forming tube. Meatballs and other food products may be processed in the latter manner.

In particular embodiments, after exiting the forming tube, as it travels through the forming tube, and/or as it exits the forming tube, the product can be coated with a desired coating, such as, but not limited to, sugar, chocolate, candy sprinkles, and the like for sweet or dessert products or corn meal for corndogs, flour or other edible coating for other food products. The coating may be aerosolized, sprayed, or otherwise deposited onto all or selected exterior surfaces of the product.

Generally described, in certain embodiments, the product is produced by introducing (typically injecting) under pressure a flowable food material(s) into an elongated substantially rigid forming tube that is configured to encase the material. The flowable material can be configured as an emulsion or slurry of a single major constituent and a liquid (such as water or other food compatible liquid) or an emulsion or slurry mixture of several different major constituents. "Major" as used herein means that that constituent is present as the primary constituent, typically as at least 10% of the volume of the emulsion or slurry. As the emulsion is pumped into and moves forward in the forming tube, the encased emulsion material alters to a non-flowable state and takes on the shape defined by the cavity of the forming tube. In certain embodiments, the product is exposed to predetermined processing conditions that alter the physical form of a flowable emulsion to a non-flowable state. The processing conditions can include one or more (selected ones or combinations) of thermal energy (hot or cold), microwave energy, RF energy, UV light, radiation, laser energy, and the like.

In certain embodiments, the change in the physical state can be chemically or thermally initiated. In particular embodiments, certain of the constituent ingredients may be chosen so that when combined and exposed to a predetermined activation condition, such as heat, they react to yield a desired change in the physical state or a desired change in the food value. Over time, the chemical or thermally-initiated reaction can cause the product to harden or become more viscous and non-flowable and form into the shape of the cavity of the forming tube. Upon release, the product has the shape of the cavity of the forming tube (and is sufficiently viscous as to be able to substantially retain that shape upon release).

In certain embodiments, the released food item may be compressible (semi-solid and yielding to tactile compression forces) or substantially incompressible (frozen or solid) at ambient conditions. The forming tube itself is configured with sufficient structural rigidity so that it has a substantially constant size and shape and is able to define the cavity without the emulsion held therein and to resist deformation when the emulsion is injected into the cavity under pressure in sufficient amount and force to cause the product to fill the cavity.

In certain embodiments, the flowable emulsion may be a meat product emulsion that can include additives (in a range of particulate sizes), flavorings, vegetables, fruits, spices, or other edible biocompatible constituents. Some constituents of the flowable emulsion may include fluids, such as liquids, solid particulates of various sizes, and ground, shredded, segmented or otherwise processed meat. In certain embodiments, the emulsion can be viscous, while in others it may be semi-viscous and/or substantially inviscid at the initiation of the process (such as at introduction into the forming tube). Thus, the systems contemplated by the present invention may be used to process food products in a wide variety of density ranges (low to high), such as water (to ice), fluffed creams, meat or meat analog slurries, and the like.

The emulsion and tube can be selected to yield the desired shape. In certain embodiments, the tube is configured to yield elongated food items including, but not limited to, hot dogs, sausages, and the like. The end food product may be at least partially elastic so as to allow some stretching without unduly altering or deforming its desired shape (from that of the mold shape) after release from the forming tube cavity.

Turning now to FIG. 1, one embodiment of a casingless food production system 10 is shown. As shown, the system 10 includes a forming tube 15, a processing region 20, a foodstuff supply source 50S comprising a flowable emulsion 30E, and a pump 40 in communication with the emulsion 30E. In operation, a quantity of emulsion 30E is advanced in a flowable state into an enclosed delivery path 15$p$ associated with the forming tube 15. As the emulsion 30E travels through the forming tube 15, it is transformed into a non-flowable state 30P. The circular shapes labeled as "A", "B", and "C" illustrate exemplary alterations in density or flowability of the food emulsion 30E as it travels through the forming tube 15. At location "A", the food product is a flowable emulsion, at location "B" some physical alteration has occurred (illustrated as a thicker density at the outermost portions of the food), and at "C" the food has been processed so that it is of a substantially constant consistency through its center (e.g., cooked). Other alteration patterns may occur depending on the desired processing result, the type of processing employed, and the food being processed.

Figure 4A:
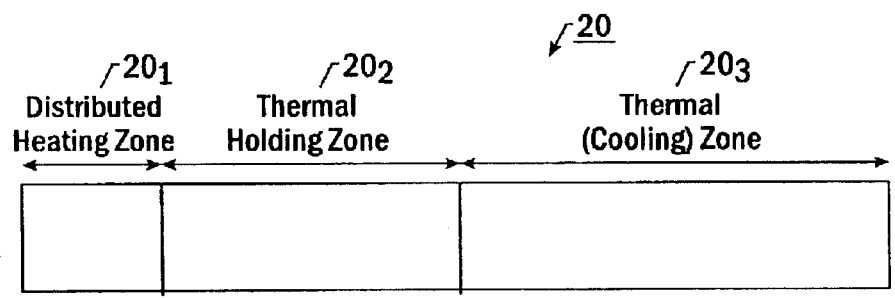
FIG. 4A illustrates three different exemplary processing conditions along a food travel path according to embodiments of the present invention.

The processing region 20 can include different processing environments. Although shown in FIG. 1 as a single region with an associated energy source 20A, the processing region 20 can be a plurality of spaced apart or continuous regions that expose the emulsion in the forming tube 15 to different environments or exposures. For example, as shown in FIG. 4A, the processing region 20 can include three different processing regions $20_1$ (shown as a heating zone), $20_2$ (shown as a thermal holding zone), and $20_3$ (shown as a cooling zone), each of which can present a different environment for the food. The food emulsion 30E can travel encased in the forming tube cavity 15C throughout each processing region $20_1$, $20_2$, $20_3$. Alternatively, in certain embodiments, the food 30E can be released from the forming tube 15 at a desired region and processed independent of the forming tube 15. If the latter is the case, the food emulsion 30E will have typically sufficiently transformed into a non-flowable state 30P such that it is structurally sufficiently rigid to substantially retain the molded shape defined by the forming tube cavity 15c. Moving floors can be used to transport the product 30P through the remainder of the processing system or region after ejection from the forming tube 15. Examples of moving floors, transport systems, receiving members and loading systems that can automatically collect, move, and/or load carrier members with lengths of elongate product are described in U.S. patent application Ser. Nos. 10/170,887; 10,171,865; 10/171,862; 10/170,823; and 10/170,869, the contents of which are hereby incorporated by reference as if recited in full herein. In other embodiments, the product 30P can be fed to conventional looping hook arrangements that hold elongate product, such as described in the background of certain of the patent applications noted above.

Figure 2A:
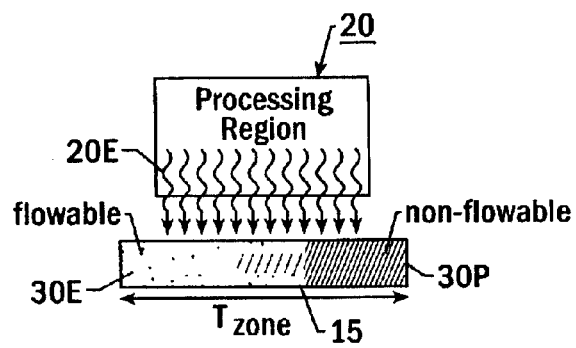
FIGS. 2A and 2B are schematic illustrations of examples of alterations in the physical state or consistency of the emulsion held in the tube as it flows along the food travel path according to embodiments of the present invention.
Figure 2B:
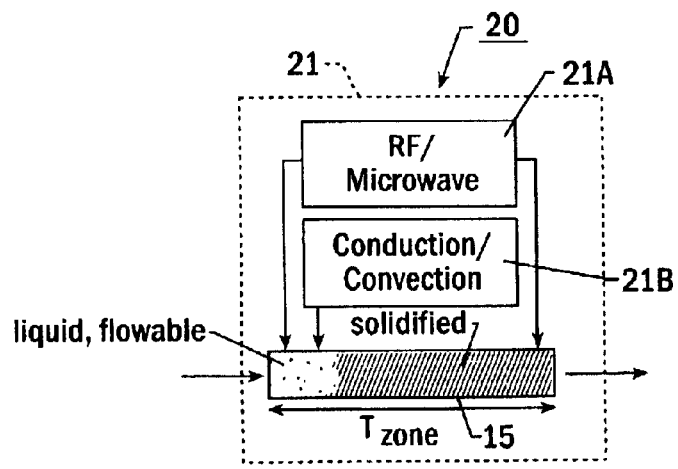
Figure 3:
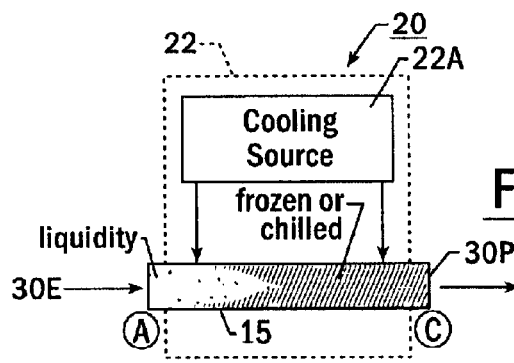
FIG. 3 is a schematic illustration similar to FIGS. 2A and 2B illustrating that a cooling source may be used in the processing region to facilitate the alteration of the flowable emulsion to a non-flowable molded shape.

FIGS. 2A, 2B, and 3 illustrate the forming tube 15 with the side cutaway to schematically show the emulsion transformation. Each of these figures also illustrates an example of an emulsion density alteration pattern (illustrated by the change in shading associated with the change in consistency and/or density). Such patterns are for exemplary illustration only and, in operation, can be influenced by the type of product processed, the size of the forming tube, the flow rate of the emulsion and the residence time and/or type of energy used in the processing regions. FIG. 2A illustrates that the processing region 20 may be configured to generate energy along a thermal zone ($T_{zone}$). The energy 20E facilitates, initiates, and/or causes the alteration from the flowable to the non-flowable state. The darker shades rendered in the graduated shading shown in FIGS. 2A, 2B, and 3 illustrate cooked, frozen, or increased density alterations in the emulsion 30E from its original flowable state.

Different types of energy and/or different levels of energy 20E may be applied along the thermal zone in the processing region 20. FIG. 2B illustrates that the processing region may comprise an oven 21 with an associated enclosed oven space. The oven 21 may include one, two, or more, different energy sources, shown by way of illustration as an RF and/or microwave energy source 21A and/or a conduction and/or convection energy source 21B. Similarly, FIG. 3 illustrates that the processing region 20 can include a refrigerator or freezer 22 having an associated substantially enclosed space with a cooling energy source 22A. In this embodiment, the emulsion 30E can be chilled or frozen as it travels along the length of the tube 15 to transform it to a non-flowable state 30P.

As shown in FIG. 1, the delivery path 15$p$ that supplies the emulsion 30E to the forming tube 15 can be curvilinear. It is noted that the forming tube 15 may also be curvilinear (not shown) or configured in a non-linear or non-cylindrical manner.

In certain embodiments, the emulsion 30E may be prepared and pumped into the forming tube in a pre-mixed blend ready for release. In other embodiments, the emulsion 30E may be blended in situ in the forming tube 15 or as it is being flowably directed thereto. As such, the delivery path 15p may be in fluid communication with one or more constituent ingredient supply sources that can allow custom blending in situ (not shown). The system 10 may include software that automatically controls remotely controllable valves and flow rates to adjust the amount of and/or type of the ingredients flowing to the forming tube 15, based on the product being produced in that production line in that batch and/or shift.

In certain embodiments, the system 10 can be configured to alternately pump emulsion 30E, then at least one selected fluid (gas and/or liquid) to help propel or move the emulsion 30E forward in the forming tube 15. For example, the system 10 can be in fluid communication with at least two different supply sources, the emulsion source 50S and the at least one fluid source (not shown), each selectively activatable to supply the path 15p and forming tube 15. In operation, a first quantity of emulsion 30E can be flowably pumped or introduced under pressure into the forming tube 15. The first quantity of emulsion 30E may correspond to the desired length of end product (such as a segment of hot dog or sausage). After a desired quantity of emulsion 30E has been introduced into the forming tube 15, a second quantity of at least one fluid, such as an aqueous based food compatible liquid (such as water), can be introduced so that it is forced under pressure along the tube 15 to abut the trailing edge portion of the emulsion 30E as it is transformed along the forming tube 15 to at non-flowable state 30P. Thus, alternating quantities of a pumping fluid or liquid and the emulsion are flowed through the forming tube 15. In operation, the pressures and amounts of each flowable substance can be selectively applied and/or adjusted to maintain a substantially constant flow rate of formed product 30P.

In other embodiments, the emulsion 30E is pumped into the forming tube 15 and the length of the forming tube 15 and/or the pumping pressure is selected so that the forward portions of the non-flowable product 30p are continuously pushed out of the forming tube 15 based on the movement of the trailing emulsion 30E in a manner that inhibits aggregation or accumulation and trapping.

Figure 7A:
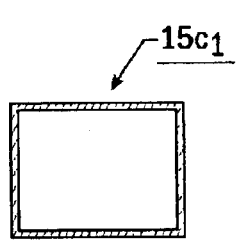
FIGS. 7A–7E are front section views of forming tubes configured to provide non-customary cross-sectional profiles of food products according to embodiments of the present invention.
Figure 7B:
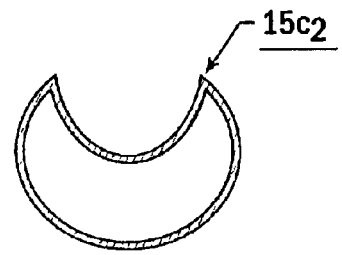
Figure 7C:
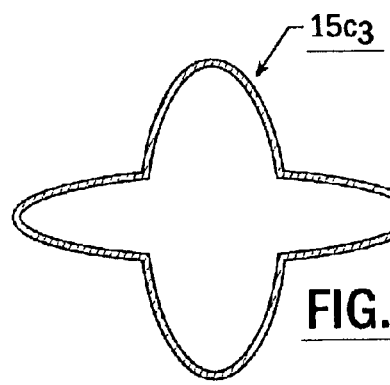
Figure 7D:
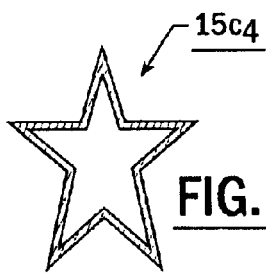
Figure 7E:
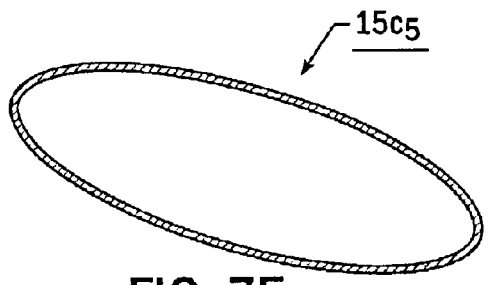

FIGS. 7A–7E illustrate that the forming tube cavities 15c can be configured to provide molded food product in non-conventional or irregular cross-sectional (non-circular) shapes. FIG. 7A illustrates a block shape (such as square or rectangular) cavity $15c_1$. If molded as a substantially constant length, this configuration can be a bar (not shown). FIG. 7B illustrates a crescent shape cavity $15c_2$. FIG. 7C illustrates a curvilinear or winged cavity $15c_3$, while FIG. 7D illustrates a star shaped cavity $15c_4$. FIG. 7E illustrates a substantially ovoid, elliptical, or football shaped cavity $15c_5$. Each cavity 15c can be configured to define an elongate three-dimensional molded product (the same or different in selected ones of the forming tubes on different production lines).

The thickness and type of materials selected to form the forming tube 15 may depend on the production environments that the food will be exposed to as well as the configuration (type and size) of the food being processed. For example, light, microwave, thermal (heat and/or cooling), and RF energies may have different demands that promote uniform and reliable transfer of the treatment to the food product and/or suitable exposures and exposure rates in an aesthetically acceptable manner. The forming tube 15 can be formed of stainless steel (such as 316 stainless steel) or other food-compatible material. In other embodiments, at least a portion of the forming tube 15 is formed of a non-metallic material. The inner surface can be configured with a non-stick surface and/or include lubrication. Examples of non-metallic material types, include, but are not limited to, resin or fiber reinforced resin, ceramic, polymer or co-polymer and blends and derivatives thereof or plastic material (such as polyvinylchloride "PVC"), silica (such as aluminosilicate or glass), or other suitable material having sufficient rigidity to withstand the operating pressures and heat. Suitable food-compatible coatings, claddings, or lubricants may also be deposited onto the surfaces of the inner wall or surface of the forming tube mold cavity 15c to inhibit contact adherence thereto. Such coatings or lubricants may be integral to the cavity material, or applied at desired intervals from an exogeneous source. One suitable material and/or coating is TEFLON® polymer.

In certain embodiments, the forming tube 15 can include a portion (such as a window or cylindrical ring) that is optically translucent or transparent to allow visualization or optical sensing of the state (intensity) of the emulsion as it travels therethrough. An optical encoder (not shown) can be used to provide an alert when image density data is outside expected limits, thereby indicating a potential problem in the processing of the emulsion (such as over-or under-cooking or cooling or an emulsion composition irregularity).

Figure 5A:
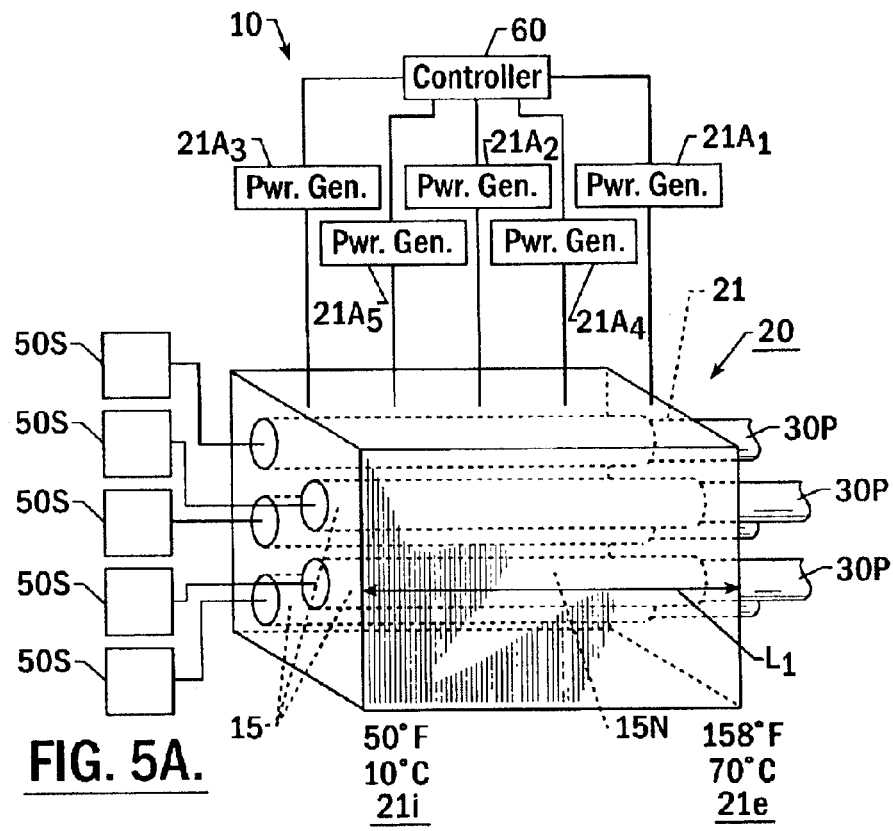
FIG. 5A is a schematic illustration of a processing system that includes a plurality of forming tubes of production lines according to embodiments of the present invention.

In certain embodiments, as shown in FIG. 5A, the processing region 20 comprises a microwave oven 21 and the forming tube 15 has a non-metallic 15N region along at least the length $L_1$ that corresponds to or is coextensive with the inner space of the microwave oven 21.

Turning back to FIG. 1, as discussed above, the processing region 20 can include one or a plurality of different treatment zones or environments. In applications that cook or heat the product 30P, the cooking, heating and/or cooling can be carried out by a selected one or combination of any suitable energy generating means as discussed above, including, but not limited to, microwave energy, RF energy, UV light, laser energy, thermal energy (heating in a conventional convection or conduction oven or cooling of freezing in refrigerators/freezers), radiation energy, and the like. As such, as the emulsion 30E in travels through the tube 15 in the processing region 20, along a predetermined travel path, and can be heated (and/or cooled) for predetermined times and temperatures.

In certain embodiments, as shown in FIG. 4A, the processing region 20 comprises three different treatment zones: (a) an active or distributed energy generating zone that $20_1$ is used to expose the food emulsion to a desired thermal energy at a desired time versus temperature profile; (b) a thermal (equilibrium) holding zone $20_2$ where the temperature of the product is held substantially constant; and (c) a thermal cooling zone $20_3$ where the temperature of the product is reduced. FIGS. 4B–4E illustrate examples of different time versus temperature profiles of exemplary processing conditions corresponding to the different processing regions. The temperature profile may correspond to a selected location in the product (such as a center region of the product to promote reliable cooking). Other temperature profiles, residence times, and the like, can be used depending on the application. For example, as shown in FIG. 4E, each thermal region can increase the temperature of the product and include a thermal holding zone. As shown, the thermal processing can be carried out to provide three increased ramped slope portions, each ending in a more level horizontal "holding" temperature portion. The thermal processing can be carried out to include cooling or combinations of heating and cooling.

Figure 4B:
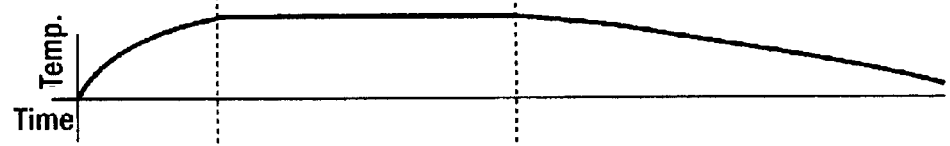
FIGS. 4B–4E are graphs of profiles of sets of data of processing temperature as a function of time for the system of FIG. 4A according to embodiments of the present invention.
Figure 4C:
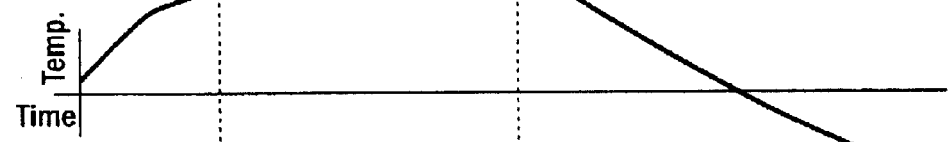
Figure 4D:
Figure 4E:
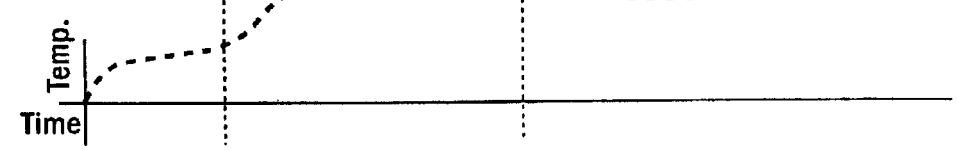

FIG. 4B illustrates that the product temperature is returned to ambient temperature and the thermal holding zone $20_2$ can hold the emulsion at a substantially constant internal temperature. FIG. 4D illustrates that the thermal holding zone $20_2$ may raise the internal temperature and then lower the product temperature to a cooled or frozen refrigerated temperature (the line extending below the initial condition). FIG. 4D illustrates that the holding zone $20_2$ may decrease the internal temperature before the product enters the cooling zone $20_3$. The cooling zone $20_3$ in FIG. 4A may be non-active or non-force cooled (fans or natural air cooling can be used) to return the product to ambient.

In particular embodiments, the thermal heating zone $20_1$ and/or the thermal holding zone $20_2$ are configured to raise the internal temperature of the emulsion to a desired temperature for a desired time. For example, in certain embodiments, the processing region 20 can be configured to raise the internal temperature of the shell enclosed emulsion 30E so that it reaches at least about 150 degrees Fahrenheit for a predetermined time. In particular embodiments, such as for meat emulsions, the product may be cooked to an internal temperature of about 158 degrees Fahrenheit.

In other embodiments, the product 30P can be cooked and then frozen in preparation for shipment. The product 30P should have sufficient structural integrity (such as after cooking but before freezing) so that the product 30P can substantially retain its molded shape when removed from its forming tube 15. In yet other embodiments, the product 30P can be directly frozen without cooking (typically for food intended to be eaten in a frozen state).

FIG. 5A illustrates that a plurality of different spaced apart forming tubes 15 can be encased or directed to extend through a common processing region 20. As shown, the processing region 20 includes an oven 21. The oven 21 is configured to enclose the plurality of forming tubes 15. The oven 21 can include one or a plurality of thermal sources (shown as five designated as $21A_1$–$21A_5$ in FIG. 5A). Each can generate thermal energy for a respective forming tube 15, or for localized regions in the oven, and/or to provide a substantially constant energy exposure across the oven so that the energy is distributed in a predetermined manner across the emulsion traveling in each of the tubes 15.

FIG. 5A also illustrates that the temperature of the product can be raised from a first starting temperature $T_1$ to a second predetermined cooked temperature $T_2$. In certain embodiments, the second temperature may be at least about double the starting temperature (measured in degrees Fahrenheit). In the embodiment shown in FIG. 5A, the temperature of the emulsion 30E may be increased from about 50° F. (10° C.) to about 158° F. (70° C.) from the ingress portion of the oven 21i to the egress portion of the oven 21e.

In certain embodiments, the oven 21 is configured to heat the emulsion 30E with one or more microwave energy generators to generate about 400–600 kW of microwave energy generated in the temperatures zone or thermal distribution region to cook the emulsion in the shells for predetermined times and energy levels as the emulsion travels enclosed in the forming tube. The power generators $21A_1$–$21A_5$ shown in FIG. 5A can be five 100 kW generators operating at about 85% efficiency can generate about 425 kW of microwave energy that can be directed to a certain portion of the processing region 20 (typically one shielded from the plant or adjacent processing regions)

In particular embodiments, the processing conditions can be selected to introduce a simulated skin layer onto the outer surface of the emulsion before its release from the tube 15. That is, relatively higher heat or energy applied to the outer perimeter can provide an increased density or drier region relative to the inner portion of the resultant non-flowable edible product. The depth or thickness, as well as the density or hardness of the skin layer, can be adjusted by the processing conditions. The tube itself may be heated (or preheated) to apply contact heat that is localized at the outer surface. In other embodiments, RF or microwave energy and the like can be used.

Figure 5B:
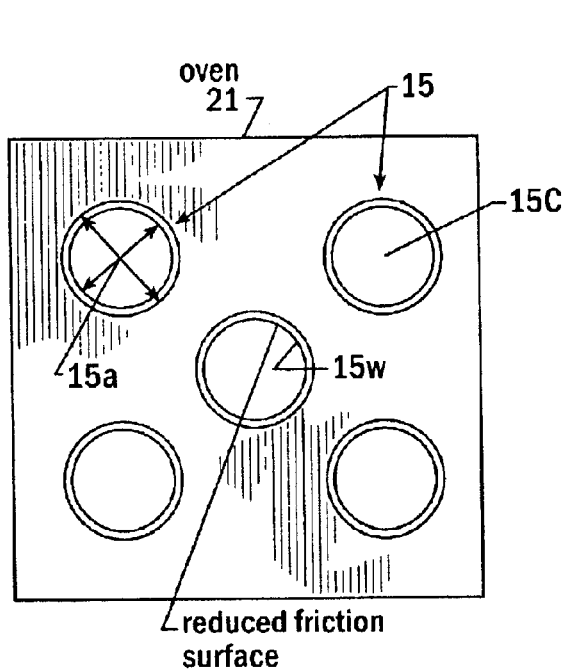
FIG. 5B is an enlarged end view of one exemplary arrangement of the plurality of forming tubes in the system shown in FIG. 5A.

FIG. 5B illustrates that each of the forming tubes 15 in the oven 21 can be in the same configuration (size and shape). In other embodiments, different size and/or shaped forming tubes 15 (not shown) can be used. The forming tubes 15 can be formed with a selected cross-sectional area and length (defining a known volume) and the rate of flow adjusted to the volume so as to provide the desired pressure.

As shown, the forming tubes 15 can have the same lengths and be configured to extend through substantially the entire length of the oven space associated with the processing region 20. In other embodiments, a respective production line may have different length forming tube 15 and the product or emulsion therein can be directed to exit the oven at a different egress portion (not shown). Each of the forming tubes 15 can be associated with a respective production line, each capable of concurrently producing molded or non-flowable products 30P. As such, the forming tube 15 for each production line can be directed to travel concurrently through a common processing region (using a processing region configured to surround a plurality of forming tubes for a plurality of production lines, with a shared heating, holding and/or cooling region). Each line may be operated to yield the same product in the same or different shapes or sizes, or different products.

As shown in FIG. 5A, the system 10 may include a central controller 60 that directs the operation of a plurality of different energy sources. The controller 60 can adjust the energy generated depending on the type of product traveling in the processing region (such as the size (volume) of the forming tube and/or type of emulsion mixture in the forming tube). The controller 60 may also be used to adjust system pressure, pump rate, valves associated with the flow path and emulsion supply source, and the like. The energy sources or power generators may be of the same type and operated to maintain a homogenous or constant energy or temperature region in the processing region. Alternatively, selected ones of the energy sources or power generators may be operated to produce local "hot" or "cold" spots or graduated heating or cooling treatment zones as desired.

Figure 5C:
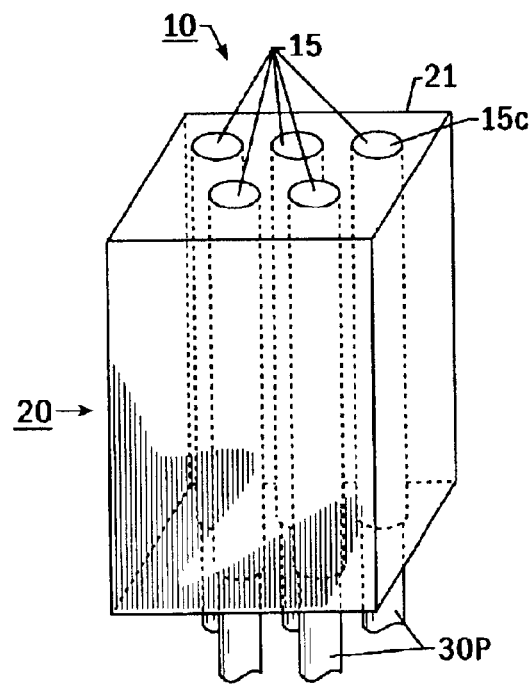
FIG. 5C is a schematic illustration of a processing system similar to that shown in FIG. 5A, but showing vertical food forming paths according to embodiments of the present invention.

FIG. 5A illustrates that the forming tubes 15 may be oriented above, below, and/or transversely spaced apart from the others and directed to flow in a substantially horizontal throughput configuration through the processing region 20. FIG. 5C illustrates a tube assembly configuration with a plurality of spaced apart forming tubes 15 held in a substantially vertical orientation. This configuration can use gravity-assisted flow to move the product along the tube(s) 15. The tubes 15 (one or more) can be held in a diagonal, sloped, curvilinear and or other configuration, arrangement and/or orientation (not shown).

In certain embodiments, the devices, systems, and methods of the present invention can be used to continually produce a series of lengths of product that can be cut or separated into desired lengths, or which can be ejected from the forming tube in a substantially desired predetermined length of a discrete product.

The term "continually" means that the apparatus can be configured to expel or provide a series of products substantially constantly over a production shift or batch. In certain embodiments, the systems 10 can be configured to process individual lines with emulsions therein to produce product at a rate of about at least 1 fps.

In particular embodiments, it is believed that certain systems contemplated by the present invention may be configured to produce over about 200 linear feet of elongate consumable meat product in less than about 1 minute. Such an automated process may be employed without requiring direct manual labor to form or remove the products from the shell, and, hence, may be particularly suitable for mass-production environments. In other particular embodiments, the system 10 may be configured with a plurality of production lines running at a rate of about 3 fps or more to produce about 5,000–15,000 lbs/hour of the same or different food products using the forming tubes contemplated by the present invention. In certain embodiments, the system 10 is configured to yield at least about 900 lbs/hour and in other embodiments, the system may yield about at least 10,000 lbs/hour of product 30P.

In certain embodiments, the tubes 15 can be configured with about a one-inch outer diameter and/or about a 0.75 inch inner diameter. Thus, in certain embodiments, such as those using five parallel lines as shown in FIGS. 5A, 5C, 6A, 6B, and 6C, and a flow rate through the tubes of about 3 fps of emulsion, which may be heated by independently controlled generators ($21A_1$–$21A_5$ as shown in FIG. 5A) and wave guides and applicators in 316 SST (and/or aluminum) (not shown) with the tubes 15 formed of TEFLON with plastic welded TriClamp connections, about 10–13,500 lbs/hour of product 30P may be produced.

In certain embodiments, the system 10 is configured to yield elongated product 30P that can be configured as a continuous length of product having a length of at least about 2 inches. In certain embodiments, the continuous length of product 30P can be at least about 1 foot. In certain embodiments, the length may be about 20–25 feet. In other embodiments, the length of a continuous product may be up to about 50 feet, or even longer (which may be subsequently divided into desired lengths). The product may be cut into desired sizes as it is held in the tube (with the tube formed with cutting apertures), as it leaves the tube, or downstream thereof.

Figure 6A:
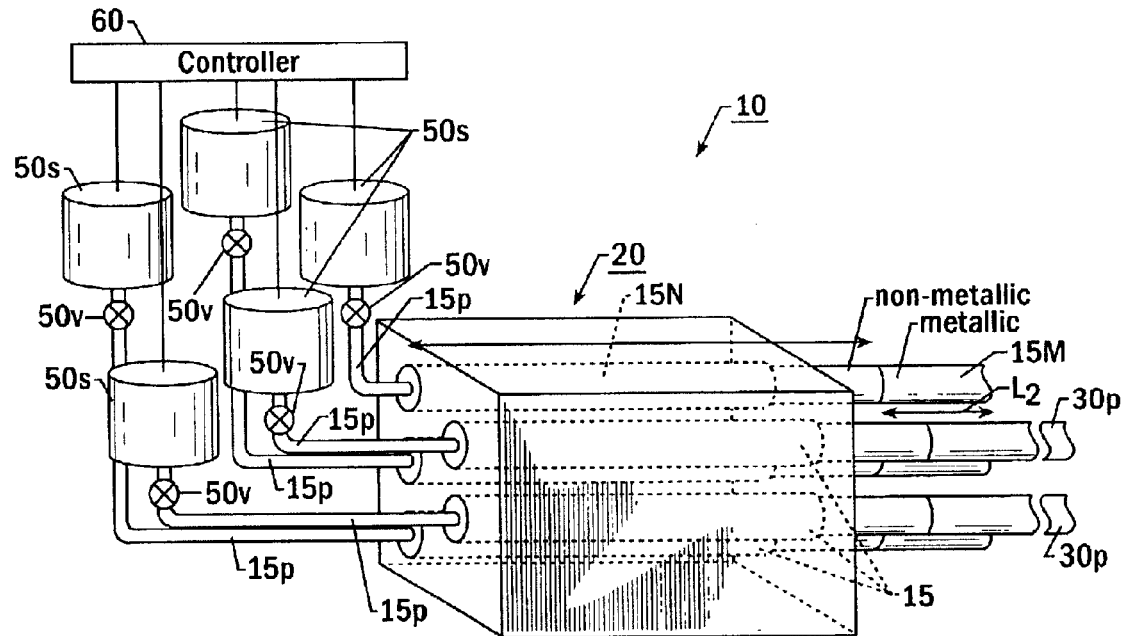
FIG. 6A is a schematic illustration of a processing system that includes a plurality of forming tubes in fluid communication with respective emulsion filled hoppers according to embodiments of the present invention.

FIG. 6A illustrates that each forming tube 15 may be in fluid communication with its own supply source 50s and associated valves 50v that control the flow rate of the emulsion that is pumped into the ingress portion of the respective forming tube 15. Each of the valves and pumps may be controlled by a common system controller 60 or separate controllers (not shown). FIG. 6A also illustrates that the tubes 15 may be configured with a non-metallic region 15N having a length $L_1$ that terminates into a region that is metallic and has a length $L_2$. The product 30P is then ejected from the metallic portion after a suitable distance. Metallic lengths may be configured in advance of and into the thermal source in the processing region 20 as well.

Figure 6B:
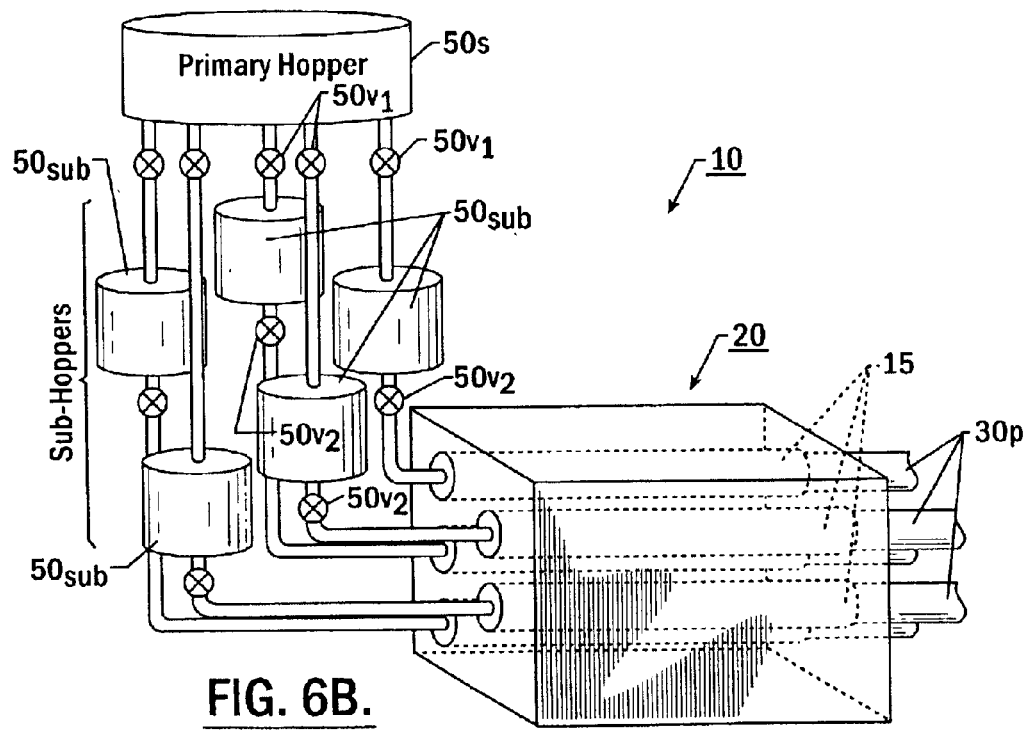
FIG. 6B is a schematic illustration of a processing system that includes a plurality of forming tubes and a plurality of sub-hoppers fed by a primary hopper according to alternative embodiments of the present invention.

FIG. 6B illustrates that the system 10 may include a primary hopper 50s that feeds a plurality of sub-hoppers 50sub, each associated with one or more of the forming tubes 15. Accordingly, the system may include associated primary and secondary valves $50v_1$, $50v_2$, respectively, along each path 15p. One or more pumps or flow sources can be disposed in the flow paths 15p as desired to provide the entry pressure and flow into the respective tubes (not shown). FIG. 6B also illustrates that the product 30P can be ejected or discharged from the forming tubes at the exit of the enclosed processing region 20 (or prior to their exit therefrom).

Figure 6C:
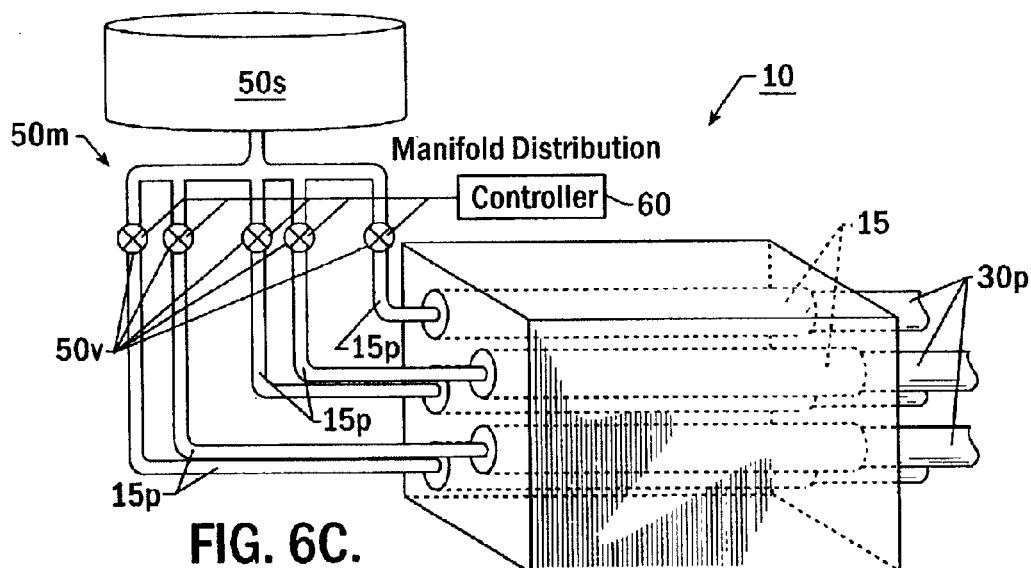
FIG. 6C is a schematic illustration of a processing system that includes a plurality of forming tubes and a primary hopper and distribution manifold according to alternative embodiments of the present invention.

FIG. 6C illustrates that the supply source 50s for a plurality of forming tubes 15 can be a primary hopper. As such, a distribution manifold 50m and associated valving 50v can be used to selectively direct the flow and emulsion quantities to the desired travel paths 15p and into the respective tubes 15. Again, the valves 50v and distribution in the manifold 50m can be controlled by a central controller 60. The valves can be remotely controlled and actuated (pneumatically, hydraulically, or electrically). The system 10 can include one or more pumps to provide the input pressure and flow rate of the emulsion into the ingress portion of the respective tubes 15.

The systems 10 may be configured to cook, freeze, smoke, cure, pickle, partially dehydrate, or otherwise process the food 50 as it moves through the processing region(s) 20.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clauses, where used, are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

What is claimed is:

1. A casingless method for producing food products, comprising:

providing at least one forming tube having sufficient structural rigidity to be substantially non-deformable and having a preformed internal cavity space of predetermined size and shape, wherein the at least one forming tube comprises an optical window;

introducing a quantity of flowable food emulsion into the at least one forming tube;

advancing the emulsion through the at least one forming tube while exposing the emulsion to predetermined processing conditions that convert the flowable emulsion held in the at least one forming tube to a non-flowable substantially fully cooked food product having the molded shape of the forming tube cavity; and automatically obtaining image data through the optical window to thereby optically detect the status of the emulsion and/or product in the forming tube during the advancing step.

2. A method according to claim 1, wherein the introducing and advancing steps are carried out so that the emulsion directly contacts the forming tube.

3. A method according to claim 2, wherein the emulsion directly contacts the forming tube during the advancing step, and wherein the at least one forming tube comprises a non-metallic region and has an inner diameter of about 0.75 inches.

4. A method according to claim 2, wherein the at least one forming tube produces at least about 900 lbs/hour of non-flowable edible product.

5. A method according to claim 1, wherein the at least one forming tube is a plurality of spaced apart forming tubes, and said steps of introducing and advancing are carried out to concurrently pump emulsion into and advance emulsion through each of said plurality of forming tubes.

6. A method according to claim 5, wherein each of the plurality of forming tubes is directed to extend through a common thermal processing region and produce at least about 10,000 lbs/hour of non-flowable human-grade consumable food product.

7. A method according to claim 1, wherein the at least one forming tube is oriented in a substantially vertical orientation, and said step of introducing emulsion is carried out to direct the flowable emulsion to travel downwardly in the vertically oriented at least one forming tube.

8. A method according to claim 1, wherein the at least one forming tube is oriented in a substantially horizontal orientation, and wherein the step of introducing emulsion is carried out to direct the flowable emulsion to travel transversely in the at least one forming tube.

9. A method according to claim 1, wherein the food product has an irregular cross-sectional profile.

10. A method according to claim 1, wherein the food product has a non-circular cross-sectional profile.

11. A method according to claim 1, further comprising heating the emulsion for predetermined times and temperatures as the emulsion travels enclosed in the forming tube.

12. A method according to claim 11, wherein the heating step is carried out to raise the internal temperature of the enclosed emulsion to at least about 150 degrees F.

13. A method according to claim 1, further comprising cooling the emulsion for a predetermined time and temperature as the emulsion travels enclosed in the forming tube in said step of advancing.

14. A method according to claim 11, wherein the heating step comprises directing microwave energy at the emulsion in the forming tube for a predetermined time and energy level as the emulsion travels enclosed in the forming tube.

15. A method according to claim 11, wherein the heating step comprises directing RF energy at the emulsion in the forming tube for a predetermined time and energy level as the emulsion travels enclosed in the forming tube.

16. A method according to claim 1, wherein the introducing step is carried out so that the emulsion enters the forming tube at a flow rate of about 3 fps.

17. A method according to claim 1, wherein the introducing step comprises pumping the emulsion into the forming tube at a sufficient pressure to cause the emulsion to flowably enter the forming tube cavity and push the material advance thereof forward.

18. A method according to claim 1, wherein at entry into the forming tube, the flowable emulsion is semi-viscous.

19. A method according to claim 1, wherein the emulsion comprises at least one type of meat.

20. A method according to claim 19, wherein the emulsion comprises at least one of pork, beef, lamb, veal, fish, and poultry and/or analogs or derivatives thereof.

21. A method according to claim 20, wherein the emulsion comprises ground pork, ground beef and ground veal.

22. A method according to claim 1, wherein the non-flowable food product comprises hot dogs.

23. A method according to claim 1, wherein the non-flowable food product comprises sausages.

24. A method according to claim 10, further comprising introducing a skin onto the outer surface of the food product during said advancing step.

25. A casingless food production system, comprising:
a plurality of forming tubes having sufficient structural rigidity to define a preformed cavity space with a predetermined configuration, the forming tubes having opposing ingress and egress portions;
at least one flowable food emulsion source in fluid communication with the ingress portion of the forming tubes;
at least one pump in fluid communication with the forming tubes for introducing emulsion from the emulsion source with sufficient pressure into the forming tubes to cause the emulsion to advance along a length of the respective tubes; and
a generally enclosed processing region operably associated with the forming tubes, wherein, in operation, the processing region is configured to concurrently expose the emulsion in the forming tubes to substantially the same predetermined processing conditions that convert the emulsion held in the forming tubes to a non-flowable food product having the molded shape of the forming tube cavity at the egress portion of the respective forming tube.

26. A system according to claim 25, wherein the processing region comprises a thermal heating source.

27. A system according to claim 25, wherein the processing region comprises a thermal cooling source.

28. A system according to claim 25, wherein the processing region comprises a thermal heating zone, a thermal holding zone, and a cooling zone.

29. A system according to claim 25, wherein the at least one forming tube has a cavity of substantially constant cross-sectional size and shape.

30. A system according to claim 25, wherein the forming tubes extend in a substantially vertical orientation.

31. A system according to claim 25, wherein the forming tubes extend in a substantially horizontal orientation.

32. A system according to claim 25, wherein the forming tubes extend in a substantially vertical orientation.

33. A system according to claim 25, wherein the forming tubes extend in a substantially horizontal orientation.

34. A system according to claim 25, wherein the forming tubes are non-metallic and have an inner diameter of about 0.75 inches.

35. A system according to claim 25, wherein at least one of the forming tubes is configured to output at its egress portion at least about 900 lbs/hour of non-flowable edible product.

36. A system according to claim 25, wherein the plurality of forming tubes are directed to extend through a common processing region, and wherein the forming tubes are configured and sized to cumulatively output at least about 10,000 lbs/hour of non-flowable edible product through their egress portions.

37. A system according to claim 26, wherein the thermal heating source is an oven having a substantially enclosed oven space, and wherein the forming tubes extend through at least a portion of the enclosed oven space.

38. A system according to claim 37, wherein the oven is a microwave energy oven.

39. A system according to claim 37, wherein the oven is a conduction and/or convection oven.

40. A system according to claim 37, wherein the oven is an RF energy oven.

41. A system according to claim 37, wherein the oven space and forming tube configurations are selected to provide a desired residence time for the emulsion in the respective forming tubes so that, in operation, the emulsion is heated for predetermined times and temperatures as the emulsion travels through the forming tubes in the oven.

42. A system according to claim 37, wherein the oven is configured to raise the internal temperature of the emulsion in the respective forming tubes to at least about 150 degrees F.

43. A system according to claim 42, wherein the processing region further comprises a cooler that cools the emulsion to a predetermined internal temperature.

44. A system according to claim 25, wherein the pump is configured to inject the emulsion into the ingress portion of the forming tubes at a flow rate of at least about 1 fps.

45. A system according to claim 25, further comprising an optical window formed on each of the forming tubes to thereby allow optical access to the emulsion traveling through the forming tubes.

46. A system according to claim 25, wherein the emulsion source comprises a flowable emulsion that has a semi-viscous density, and wherein the forming tube and pump are configured to force the semi-viscous emulsion through the forming tube to the processing region where the emulsion is cooked and a skin layer is formed over an outer surface thereof.

47. A system according to claim 25, wherein the emulsion source comprises a flowable emulsion that comprises at least one meat and/or meat analog or derivative thereof, and wherein the forming tube is sized and configured to allow the emulsion to travel substantially continuously therethrough.

48. A system according to claim 47, wherein the emulsion source comprises a flowable emulsion that comprises at least one of pork, beef, veal, fish, and/or poultry.

49. A system according to claim 47, wherein the emulsion source comprises a flowable uncooked emulsion of ground pork, ground beef and ground veal.

50. A system according to claim 25, wherein the emulsion source comprises a flowable emulsion material, and wherein the forming tube is sized and configured to allow the emulsion material to travel therethrough so that the emulsion is cooked as it travels through the processing region and exits the forming tube as hot dogs.

51. A system according to claim 26, wherein the emulsion source comprises a flowable emulsion material, and wherein the forming tube is sized and configured and cooperates with the thermal source to turn the emulsion into cooked sausages.

52. A system according to claim 26, wherein, the thermal source and the forming tubes are cooperatively arranged so that in operation, an outer layer of skin having an increased density relative to the underlying emulsion material is formed onto the food product which is substantially cooked, based on processing conditions generated in the processing region by the thermal source prior to its exiting from the egress portion of the forming tube.

53. A system according to claim 52, wherein the skin layer is generated by at least one of the residence time of the emulsion in the respective forming tube in the processing region, the type of processing energy employed by the thermal source in the processing region, the energy level generated by the thermal source in the processing region, and/or the temperature generated by the thermal source that the outer region of the emulsion is exposed to while in the forming tube.

54. An apparatus for producing casingless food products, comprising:

a plurality of spaced apart forming tubes, each having sufficient structural rigidity to be substantially non-deformable and having a preformed internal cavity space of predetermined size and shape;

a pump for flowably introducing a quantity of flowable food emulsion into the forming tubes; and means for advancing the emulsion through the forming tubes while exposing the emulsion to predetermined substantially similar environmental processing conditions in a common enclosed processing apparatus configured to convert the flowable emulsion held in the forming tubes to a non-flowable food product having the molded shape of the respective forming tube cavity.

55. An apparatus according to claim 54, wherein the forming tubes comprise an optically translucent or transparent window configured to allow automatic optical detection of the state of the emulsion as the emulsion travels through the forming tubes.

* * * * *